Feb. 12, 1924.  
J. L. GROSSMAN  
1,483,300  
SHIPPING AND IDENTIFICATION TAG HOLDER  
Filed Oct. 15, 1921
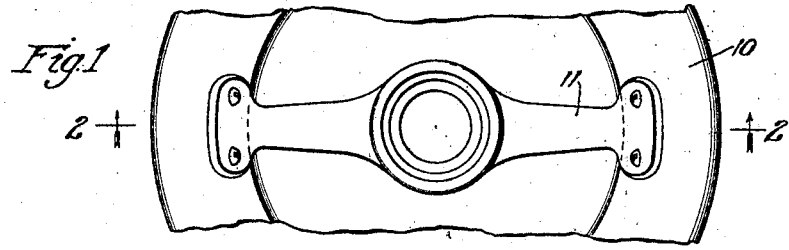
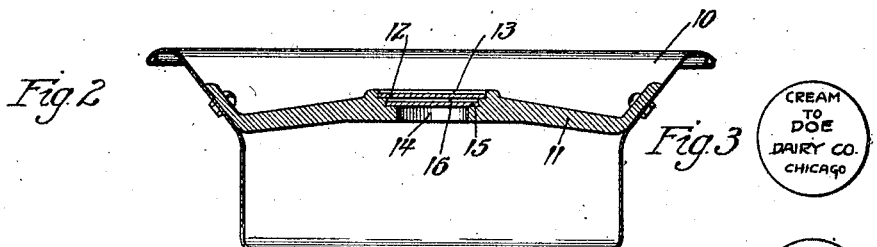
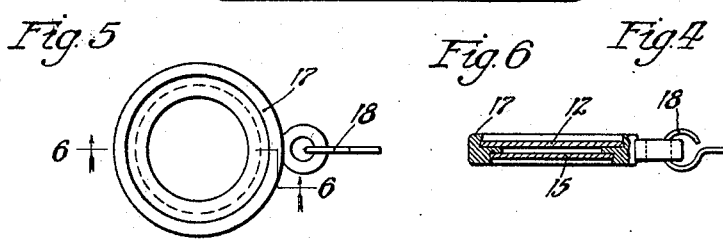
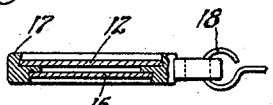
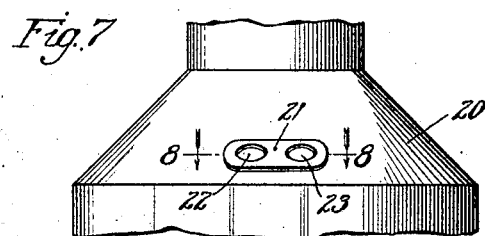
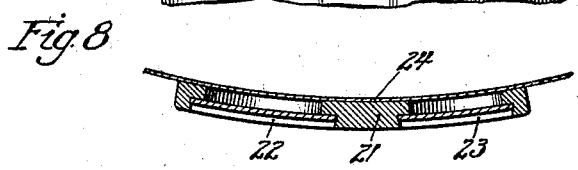
Inventor.  
Joseph L. Grossman.  
By: Gabel & Mueller  
Attys.

Patented Feb. 12, 1924.

1,483,300

UNITED STATES PATENT OFFICE.

JOSEPH L. GROSSMAN, OF CHICAGO, ILLINOIS.

SHIPPING AND IDENTIFICATION TAG HOLDER.

Application filed October 15, 1921. Serial No. 507,957.

*To all whom it may concern:*

Be it known that I, JOSEPH L. GROSSMAN, a citizen of the United States, residing at Chicago, in the county of Cook and State of Illinois, have invented a certain new and useful Improvement in Shipping and Identification Tag Holders, of which the following is a full, clear, concise, and exact description, reference being had to the accompanying drawings, forming a part of this specification.

My invention relates to shipping and identification tag holders an object being to provide an improved and simplified device of this character, a feature being the provision of an annularly recessed tag holding opening for receiving a stiff card board tag adapted preferably to be pressed into and held by the recess. As illustrated herein, the invention is directed more particularly for use with milk cans although by no means limited thereto.

In shipping milk cans back and forth between the farmers and dairy-men, the same cans are sent back and forth almost daily and heretofore it has been the practice to tie the usual type of shipping tag to the can when being sent in from the farmer to the dairyman. Also the cans are shipped to consumers with different grades of milk or cream therein and it is desirable that identifying descriptive tags be attached thereto. These tags are usually fastened to the can handles with wire or string and due to their hanging loose from the can readily become detached or mutilated due to the rough handling in transferring the cans back and forth between the wagons, platforms and cars.

To overcome the various objections to the use of these tags, I have provided an improved tag holder in which an annular recessed opening is provided either in the can handle or other member which may be attached to the can, this recess being preferably of a size to receive and hold tags of a size and shape corresponding to those used for the ordinary milk bottle caps. Many of the milk bottle caps as now printed contain identifying marks and the names and addresses of the shipper or producer of the milk and also of the dairyman. Or where the producer is shipping milk in to the dairyman the dairyman can supply the caps which he uses on his milk bottles.

For a better understanding of my invention, reference is to be had to the accompanying drawing in which Fig. 1 is a plan view of a portion of a milk can cover showing the handle with my improved shipping tag holder thereon;

Fig. 2 is a sectional view along the line 2—2 of Fig. 1;

Fig. 3 shows the preferred form of tag used with the consignee's name thereon;

Fig. 4 shows the tag with the shipper's name thereon;

Fig. 5 is a face view of my improved tag holder applied to a separate member adapted to be attached to the can or other device which is to be shipped;

Fig. 6 is a sectional view along the line 6—6 of Fig. 5;

Fig. 7 shows a different type of shipping tag holder which is adapted to be soldered or secured in other ways to the shoulder of the milk can; and Fig. 8 is a sectional view along the line 8—8 of Fig. 7.

Referring now more in detail to the form of my invention as shown in Figs. 1 to 4, I have shown a milk can cover 10 of ordinary construction, provided with a handle 11 having an annularly recessed flanged opening 12 therein for receiving a stiff paper tag 13 which is adapted to be pressed into the recess and held by the converging sides thereof.

The holder is preferably provided with an opening 14 extending therethrough so that the tag may be readily pushed out of the top by pressing against the bottom through the opening 14. A second annularly recessed opening 15 is also shown in the handle 11 being slightly smaller than the upper recess 12 and containing a smaller tag 16. This duplex recess is arranged so as to receive either one of two standard size tags as now in general use, these tags being the paper caps for closing milk bottles. Thus, a handle provided with the two sizes of recesses could be used for either size of cap.

In Figs. 3 and 4 I have shown a cap, Fig. 3 showing the consignee's name and Fig. 4 showing the consignor's name, these names either appearing on opposite sides of the same tag or upon different tags. Thus, where one tag is used with the names on opposite sides, when the can is being shipped in one direction the tag is turned with one name up and when shipped in the other direction the tag is simply reversed.

In Figs 5 and 6 I show another form of my invention in which it is applied to a separately attachable member 17 provided with a link 18 whereby it may be secured to the milk can or whatever is to be shipped. In this device I show the large standard recess 12 and the small standard recess 15, one on each side so that it may be used for either size cap.

In Figs. 7 and 8 I have shown another form of my invention in which it is applied to the shoulder 20 of a milk can. There are several different principal types of cans and covers in general use, one on which a handled cover of the type as shown in Figs. 1 and 2 is used and another using a so-called mush-room type of cover without a handle.

In connection with this latter type of can and cover, my invention may be applied thereto by providing a receptacle 21 having two openings 22—23 therein and of a contour at 24 adapted to fit the shoulder 20 of the can so that it may be intimately attached thereto with solder, rivets or otherwise. Thus, with the two recesses 22—23 one tag may be placed in one with the shipper's name on it and a tag placed in the other with the consignee's name on it, or the recesses may be of two standard sizes so as to receive either one of the caps in general use.

For the purpose of illustration I have shown several preferred forms of my invention in which the standard bottle paper cap is to be used, but I understand that changes and modifications may be readily made and contemplate applying it in other ways than that shown. Therefore, I do not desire to be limited to the exact structure as shown and described, but aim to cover all that which comes within the spirit and scope of the appended claims.

What I claim as new and desire to secure by United States Letters Patent is:

1. A shipping tag and holder of the character described comprising a stiff, flat paper tag having shipping indicia thereon and a ring shaped integral body member having a shallow restricted flanged opening, the walls of which taper slightly outwardly from the restricted entrance to the flange and into which the tag is readily removably pressed to seat against the flange, and means for securing the holder to the article to be shipped.

2. A shipping tag and holder of the character described comprising a stiff, flat paper tag having shipping indicia thereon and a ring shaped integral body member having a shallow restricted flanged opening through the body into which the tag is readily removably pressed to seat against the flange and accessible from both sides, and means for securing the holder to the article to be shipped.

3. A tag holder for attachment to the article to be shipped comprising a main flat body member having a plurality of superposed annularly recessed flanged openings for removably receiving stiff, flat paper tags suitably marked and exposed for reading through the openings.

4. A shipping tag and holder of the character described comprising stiff, flat paper tags having shipping indicia thereon, and a ring shaped body member having a plurality of superposed shallow restricted flanged openings into which one or more of said tags may be readily removably pressed, and means for securing the holder to the article to be shipped.

5. A tag holder for attachment to the article to be shipped comprising an integral main flat body member with an annularly recessed flanged opening for removably receiving a standard milk bottle cap suitably marked and exposed for reading, the walls of said recess tapering slightly outwardly from a restricted entrance to the flange whereby the cap may be pressed through the restricted opening and firmly seat in the recess against the flange.

In witness whereof, I hereunto subscribe my name this 5th day of October, A. D. 1921.

JOSEPH L. GROSSMAN.